(12) United States Patent
Rust

(10) Patent No.: US 11,589,558 B2
(45) Date of Patent: *Feb. 28, 2023

(54) ANIMAL BARK CONTROL DEVICE AND METHOD

(71) Applicant: Kathryn Rust, Hermitage, TN (US)

(72) Inventor: Kathryn Rust, Hermitage, TN (US)

( * ) Notice: Subject to any disclaimer, the term of this patent is extended or adjusted under 35 U.S.C. 154(b) by 31 days.

This patent is subject to a terminal disclaimer.

(21) Appl. No.: 17/228,533

(22) Filed: Apr. 12, 2021

(65) Prior Publication Data

US 2021/0227795 A1    Jul. 29, 2021

Related U.S. Application Data

(63) Continuation of application No. 16/202,253, filed on Nov. 28, 2018, now Pat. No. 11,000,017.

(51) Int. Cl.
*A01K 27/00* (2006.01)

(52) U.S. Cl.
CPC .......... *A01K 27/009* (2013.01); *A01K 27/002* (2013.01)

(58) Field of Classification Search
CPC ..... A01K 27/00; A01K 27/002; A01K 27/009
See application file for complete search history.

(56) References Cited

U.S. PATENT DOCUMENTS

| | | | | |
|---|---|---|---|---|
| 6,830,014 B1 * | 12/2004 | Lalor | ................... | A01K 15/021 119/859 |
| 8,539,913 B2 * | 9/2013 | Caputo | ................ | A01K 15/021 119/859 |
| D742,373 S * | 11/2015 | Ji | .................................. | D14/344 |
| D749,072 S * | 2/2016 | Ji | .................................. | D14/344 |
| D749,569 S * | 2/2016 | Ji | .................................. | D14/344 |
| 9,258,982 B1 * | 2/2016 | Golden | ................ | A01K 15/021 |
| D752,043 S * | 3/2016 | Ji | .................................. | D14/344 |
| D752,578 S * | 3/2016 | Ji | .................................. | D14/344 |
| 9,861,080 B1 * | 1/2018 | Hathway | ............. | A01K 27/001 |
| 10,271,524 B2 * | 4/2019 | Chen | .................... | A01K 27/001 |
| D851,339 S * | 6/2019 | Solinsky | ..................... | D30/152 |
| 10,674,709 B2 * | 6/2020 | Goetzl | ................. | A01K 29/005 |
| 2003/0013420 A1 * | 1/2003 | Redmond | .............. | H04B 1/385 455/39 |
| 2005/0061259 A1 * | 3/2005 | Lalor | ................... | A01K 27/009 119/859 |

(Continued)

*Primary Examiner* — Monica L Perry
*Assistant Examiner* — Aaron M Rodziwicz
(74) *Attorney, Agent, or Firm* — Argus Intellectual Enterprise; Jordan Sworen; Daniel Enea

(57) ABSTRACT

A device for controlling the bark of an animal. The animal bark control device includes a housing having a curved bottom side extending between opposing distal ends forming an open neck receiving area. The curved bottom side can rest flush against a neck of a dog when mounted thereon. A speaker is disposed on a front side of the housing such that the speaker faces toward an ear of the dog when the housing is secured to a dog collar and mounted against the neck of the dog. The animal bark control device mounts to a dorsal region of a pet dog thereby allowing the speaker to deliver an audible corrective sound directly to the dog. A bridge extends from the housing, wherein the housing is movable along a longitudinal length of the bridge in order to adjust the placement of the housing when mounted to the dog.

19 Claims, 5 Drawing Sheets

(56) References Cited

U.S. PATENT DOCUMENTS

| | | | | |
|---|---|---|---|---|
| 2006/0112905 | A1* | 6/2006 | Lalor | A01K 27/009 119/859 |
| 2006/0169222 | A1* | 8/2006 | Gerig | A01K 15/021 119/859 |
| 2007/0204803 | A1* | 9/2007 | Ramsay | A01K 27/009 119/720 |
| 2008/0163827 | A1* | 7/2008 | Goetzl | A01K 15/021 119/859 |
| 2009/0139462 | A1* | 6/2009 | So | A01K 15/021 119/719 |
| 2010/0139575 | A1* | 6/2010 | Duncan | A01K 15/021 340/573.3 |
| 2011/0061605 | A1* | 3/2011 | Hardi | A01K 27/009 340/573.3 |
| 2011/0132275 | A1* | 6/2011 | Huo | A01K 15/021 119/858 |
| 2011/0205069 | A1* | 8/2011 | Liu | A01K 27/009 340/573.3 |
| 2012/0160181 | A1* | 6/2012 | So | A01K 15/021 119/720 |
| 2013/0141237 | A1* | 6/2013 | Goetzl | A01K 15/021 340/539.13 |
| 2014/0073486 | A1* | 3/2014 | Ahmed | A61B 5/1112 600/479 |
| 2014/0123912 | A1* | 5/2014 | Menkes | A61B 5/0004 119/859 |
| 2014/0196673 | A1* | 7/2014 | Menkes | A61B 5/0205 119/859 |
| 2014/0311423 | A1* | 10/2014 | Roney, III | A01K 27/002 119/856 |
| 2014/0331942 | A1* | 11/2014 | Sarazyn | A01K 29/005 119/859 |
| 2015/0038886 | A1* | 2/2015 | Snow | A61H 23/02 601/46 |
| 2015/0057963 | A1* | 2/2015 | Zakharov | A61B 5/01 702/131 |
| 2015/0099472 | A1* | 4/2015 | Ickovic | A01K 27/009 455/66.1 |
| 2016/0366857 | A1* | 12/2016 | Polk | A01K 27/001 |
| 2017/0135315 | A1* | 5/2017 | Marmen | A01K 27/001 |
| 2017/0208775 | A1* | 7/2017 | Van Curen | A01K 15/023 |
| 2017/0360004 | A1* | 12/2017 | Carver | A01K 27/001 |
| 2017/0372580 | A1* | 12/2017 | Vivathana | G01S 19/42 |
| 2018/0125038 | A1* | 5/2018 | Hord | G08B 15/00 |
| 2018/0132450 | A1* | 5/2018 | Goetzl | A01K 15/021 |
| 2018/0153137 | A1* | 6/2018 | Goetzl | A01K 29/005 |
| 2018/0153138 | A1* | 6/2018 | Goetzl | A01K 15/029 |
| 2018/0303066 | A1* | 10/2018 | Weimin | B05B 12/122 |
| 2019/0133084 | A1* | 5/2019 | Landers | A01K 27/001 |
| 2020/0068852 | A1* | 3/2020 | Ramsay | A01K 29/005 |
| 2020/0170222 | A1* | 6/2020 | Gotts | A01K 27/009 |

\* cited by examiner

ANIMAL BARK CONTROL DEVICE AND METHOD

CROSS REFERENCE TO RELATED APPLICATION

This application claims the benefit of pending U.S. Nonprovisional application Ser. No. 16/202,253 filed on Nov. 28, 2018; the above identified patent application is herein incorporated by reference in its entirety.

BACKGROUND OF THE INVENTION

The present invention relates to an animal bark control device. More specifically, the present invention provides an animal bark control device and method to soothe a barking and excited dog or prevent barking. The animal bark control device provides a speaker positioned in close proximity to the ears of a dog so as to produce tranquil sounds or relay commands from an owner from a paired remote electronic device.

Most pet owners know the problems associated with controlling the barking of a pet dog. Dogs naturally bark for many reasons such as to signal other dogs, to define their territory, to communicate excitement or fear, and to warn prior to an attack. When a dog owner lives in an area closely proximate to other people or the dog is easily riled such that it barks at the slightest of noises, the barking of a dog can become a nuisance to both the dog owner and the neighbors. Further, constant barking may be a signal that the dog is agitated or uncomfortable.

Various techniques have been developed to control the barking of a dog. First, the bark of a dog can be controlled surgically by the removal of the larynx. However, this solution is usually unacceptable to the pet owner as unnecessarily cruel and expensive. Second, standard obedience techniques can be used to train the dog to not bark, but this is time consuming and often requires the presence of the owner to correct the dog. If the owner is absent from the home for long periods of time, such as at work, the dog may learn to not bark only when the owner is present, remaining a nuisance while the owner is away.

Finally, remote and automatic systems using various trigger mechanisms have been developed to control the barking of a dog. For example, these remote and automatic systems deliver an electronic pulse to the dog upon detection of a bark, or an external sound that falls within the defined parameter of a bark, as a barking deterrent. Many pet owners find these devices ineffectual and cruel, as the delivery of a painful electronic pulse confuses the dog and hampers effective training with false triggers.

The present invention provides an animal bark control device that aims at reducing the frequency and duration of barking caused by external sources. Additionally, the animal bark control device reduces the associated stress of both the pet and owner. The delivery of sound directly to the pet reduces the instinctual barking and can interrupt a series of barks by distracting the pet with sounds directed at the pet. Furthermore, in some embodiments, the animal bark control device connects an owner to the pet via a wireless communication system that notifies the owner of a bark and allows for direct commands to be communicated to the pet. The sound created by the pet is detected by the animal bark control device and emitted through a remote control. In this way, the owner is able to detect the location or confirm the safety of the pet when the pet is not visible to the owner.

The above references methods and devices that have been disclosed in the known art that relate to controlling the barking of a pet. These include methods and devices that have been patented and published in patent application publications. However, none of these known art methods and devices provide the configuration of controlling the bark of a dog as disclosed by the presently claimed invention. The prior art lacks a system for controlling the barking of a pet dog which can be used at all times of the day, without the need for human monitoring. Further, none of the prior art devices filter extraneous noises and only apply a corrective stimulus when the particular dog barks in such a way as to trigger the system.

In light of the devices disclosed in the known art, it is submitted that the present invention substantially diverges in design elements from the known art and consequently it is clear that there is a need in the art for an improvement for controlling barking of pet and to reduce the associated stress. In this regard the instant invention substantially fulfills these needs.

SUMMARY OF THE INVENTION

In view of the foregoing disadvantages inherent in the known types of animal bark control devices and methods now present in the known art, the present invention provides a new animal bark control device and method wherein the same can be utilized for controlling a pet when an external noise or disturbance causes the dog to bark or become otherwise excitable. Furthermore, emergency personnel, such as police, bomb squads, search and rescue organizations, may use the present invention to serve the public when animals are employed for service.

In one embodiment of the invention, the animal bark control device provides a housing having a speaker that operates to play an audible corrective sound directly to the pet. The housing is secured to a dorsal region of the pet via a harness and is repositionable along a bridge that extends along a longitudinal length. The corrective sound can be continuously activated, triggered contemporaneously with a detection of a bark, or manually activated by controls on the housing or a remote electronic device. In other embodiments, the housing is configured to detect sound emitted from the pet via a microphone and transmit the sound to a remote control or other handheld unit.

In the exemplary embodiment, the housing includes a curved bottom side configured to rest flush against a neck of the pet dog. The position and dimension of the housing ensures that the corrective sound remains in close proximity to each ear of the pet, to overcome the external stimulus.

It is therefore an object of the present invention to provide a new and improved new animal bark control device that has all of the advantages of the known art and none of the disadvantages.

It is another object of the present invention to provide a new animal bark control device for delivering a corrective sound in close proximity to the pet.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 shows a perspective view of an embodiment of the animal bark control device.

DETAILED DESCRIPTION OF THE INVENTION

Figure 1:
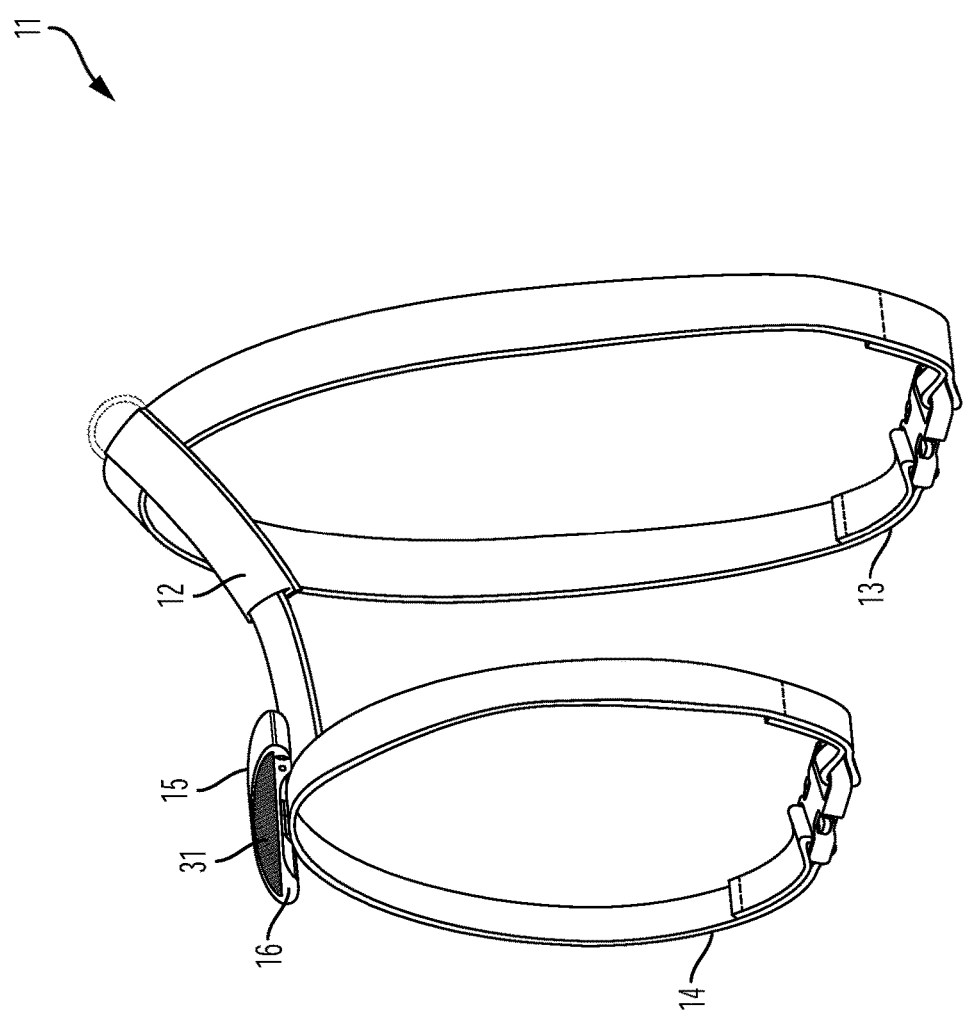

Reference is made herein to the attached drawings. Like reference numerals are used throughout the drawings to depict like or similar elements of the animal bark control device. For the purposes of presenting a brief and clear description of the present invention, the preferred embodiment will be discussed as used for an animal bark control device. The figures are intended for representative purposes only and should not be considered to be limiting in any respect. For exemplary purposes and for continuity, the animal used in the description is a pet dog. However, the animal bark control device is adapted for use with any quadruped animal.

Referring now to FIG. 1 there is shown a perspective view of an embodiment of the animal bark control device. The animal bark control device 11 provides a housing 15 having a speaker 31 that operates to play an audible corrective sound directly to the pet. The animal bark control device 11 is configured to mount to a dorsal region of a dog, and is selectively repositionable, thereby allowing the speaker to deliver the corrective sound directly to the dog. This corrective sound can calm an already barking dog, distract the dog from an external sound that triggered the barking, or deliver commands from a user via a remote control device or software application installed on a smart device of the user.

Figure 5:
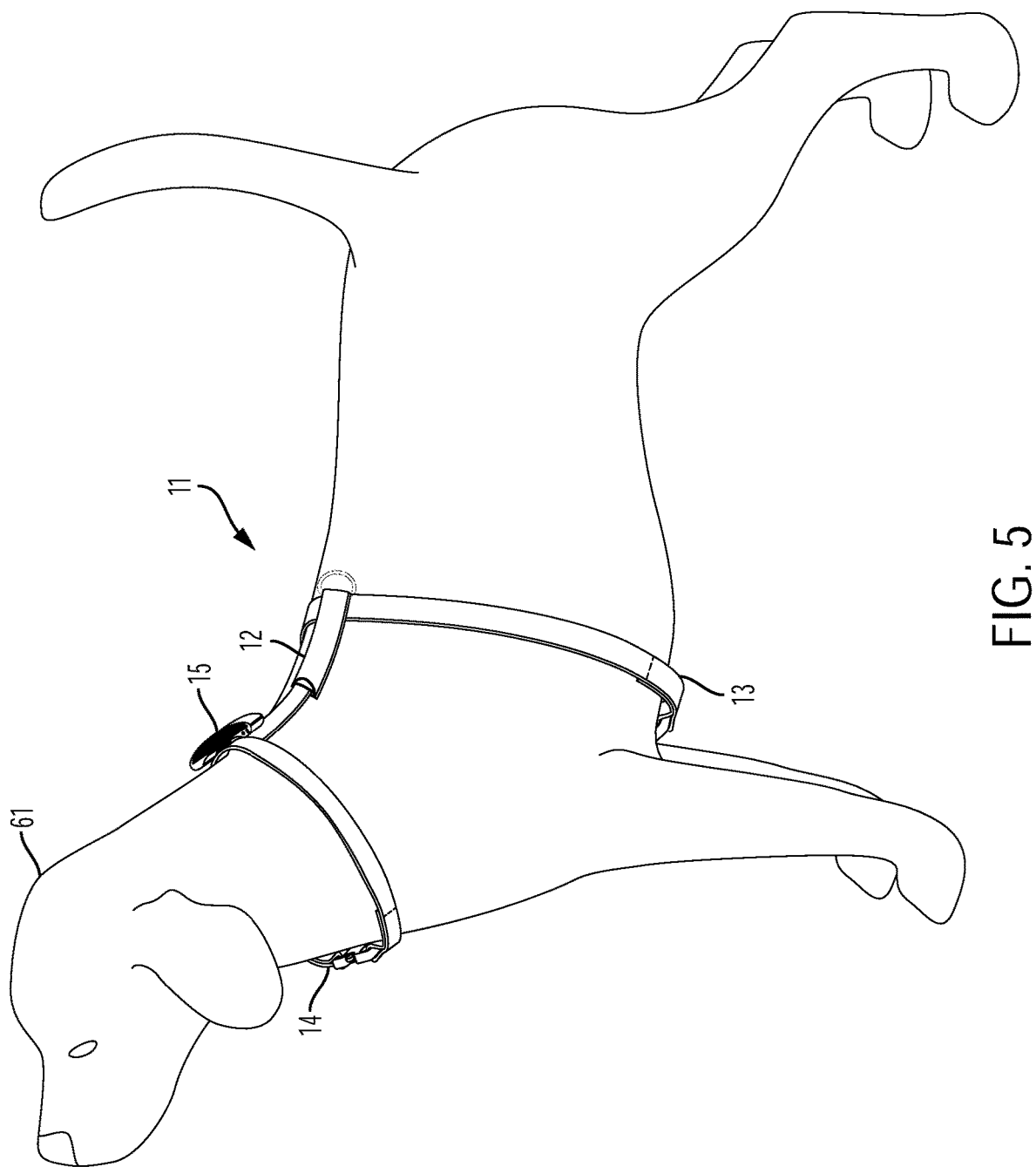
FIG. 5 shows a side view of an embodiment of the animal bark control device in use and mounted to a dog.

In the shown embodiment, the animal bark control device 11 comprises a waterproof housing 15 with a speaker 31 that is securable to the dorsal region of the dog via a harness 13 and a collar 14 connected to one another via a bridge 12 extending therebetween. However, in some embodiments, the animal bark control device comprises the collar and the bridge, without a harness. In the illustrated embodiment, the housing 15 is operably connected to the bridge via a fastener disposed on the bridge 12. The bridge 12 extends along a longitudinal length when attached to a dog and generally over a spine of the dog. The longitudinal length is defined as running along an axis between the tail and head of the dog. The housing 15 is selectively positionable rearward and in close proximity to the ears of the dog, so as to deliver sound from the speaker 31, as shown in FIG. 5. In the illustrated embodiment, the speaker 31 is disposed on the front side 16 of the housing 15 configured to face toward an ear of the dog when the housing 15 is secured to the bridge and mounted against the neck of the dog. In other embodiments, the fastener is positioned on the collar and the housing 15 is removably secured directly thereto.

In the shown embodiment, the bridge 12 is centrally disposed on the harness 13 such that the harness 13 is positioned on opposing lateral sides thereof. The bridge 12 extends from the housing 15, wherein the housing 15 is movable along the longitudinal length. (See FIG. 2.) In the illustrated embodiment, the bridge 12 is composed of a flexible material. However, in alternate embodiments, the bridge is composed of a rigid material in order to better maintain the position of the housing 15 when secured to the dog and serves to adjust the position of the housing 15 relative to the harness 13. In some embodiments, the bridge 12 comprises a soft material that is flexible, such as nylon or fabric, in order to provide additional comfort when mounted to the dog. The repositioning of the housing 15 relative to the location of the harness allows the animal bark control device to be used on various sized dogs.

In the shown embodiment, the housing 15 is removably connected to the bridge such that a power source within the housing 15 can be charged or cleaned independent of being secured to the dog. The housing 15 is removably securable to the bridge via any suitable means, such as hook and loop material, a magnet, or a clip. In alternate embodiments, the housing 15 is permanently secured to the bridge so as to provide additional stability to the positioning of the housing 15 when disposed thereon.

Figure 2:
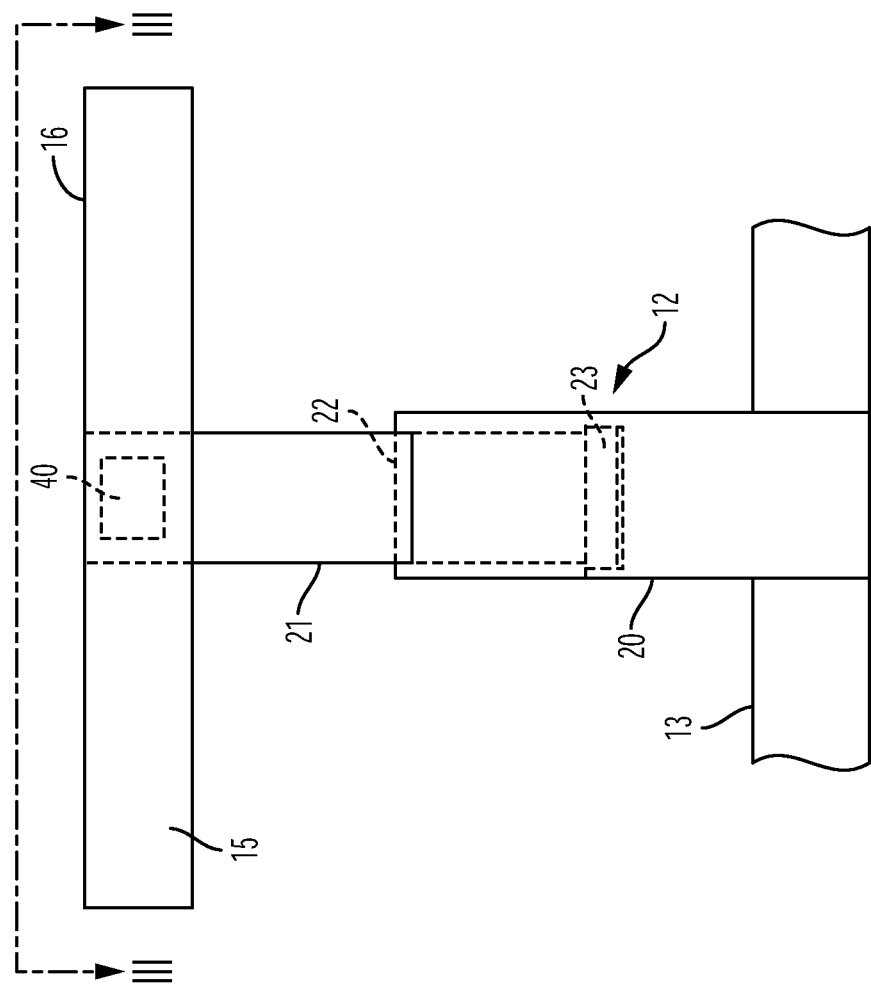
FIG. 2 shows an overhead view of an embodiment of the animal bark control device.

Referring now to FIG. 2 there is shown an overhead view of an embodiment of the animal bark control device. In the illustrated embodiment, the bridge 12 comprises a first strap 21 and a second strap 20, wherein the first strap 21 and second strap 20 are aligned and movable relative to each other along the longitudinal length. In the shown embodiment, the housing 15 is disposed on a distal end of the second strap 20 and the harness 13 is disposed on a distal end of the first strap 21. Further, the bridge 12 extends from a center section of the housing 15, equidistant from the opposing distal ends of the housing 15. In this way, the speaker is positioned such that the speaker is in equidistance from each ear of the dog when mounted thereon.

The animal bark control device 11 is configured to be reconfigurable by selectively adjusting the length of the bridge 12. In the illustrated embodiment, the first strap 21 sheaths a first end of the second strap 20, wherein the second strap 20 is configured to move between an extended configuration and a retracted configuration. In the retracted configuration, the housing 15 is positioned closer to the harness 13 and the longitudinal length of the bridge 12 is relatively less than the longitudinal length of the bridge 12 in the extended configuration. In this way, the animal bark control device 11 can be selectively fitted to any size dog, while maintaining a desirable distance between the speaker and the ears of the dog. Thus, the speaker delivers the audible corrective sound directly to the dog.

In one embodiment, the bridge 12 further includes an adjustment mechanism 23. The adjustment mechanism 23 is configured to assist with the transition between the extended configuration and the retracted position. In the illustrated embodiment, the adjustment mechanism 23 is disposed within the second strap 20 and secured directly to the first strap 21. The adjustment mechanism 23 includes a ratchet cooperatively engaged with the first strap 21, wherein rotation of the ratchet in a first direction and an opposing second directed causes the first strap 21 to wind therearound and move between the retracted configuration and the extended configuration, respectively. In one embodiment, the ratchet includes a spring biased to the retracted configuration. However, alternative embodiments include any suitable adjustment mechanism 23 that permits the adjustment of the length of the bridge, such as a ball detent latch, a locking pin, or an elastic connection between the first and second strap. The first strap 21 extends through an open slot 22 disposed on the second strap 20, wherein the open slot 22 is oriented traverse the longitudinal length of the bridge. In this way, the adjustment mechanism 23 is not exposed to the exterior and hidden from view.

In the illustrated embodiment, the second strap 20 of the bridge 12 extends over the top end of the harness 13. However, in alternate embodiments, the second strap extends from an innermost edge of the harness 13, such that the bridge abuts the harness and does not overlap the harness. In some embodiments, the bridge 12 is removably secured to the harness 13 in order to allow a user to secure the bridge 12 and housing 15 to a pre-existing harness. In some embodiments, the first strap 21 abuts the innermost edge of the collar (collar not shown in FIG. 2). However, in alternate embodiments the first strap overlaps the collar such that the housing 15 rests directly atop the collar.

Figure 3:
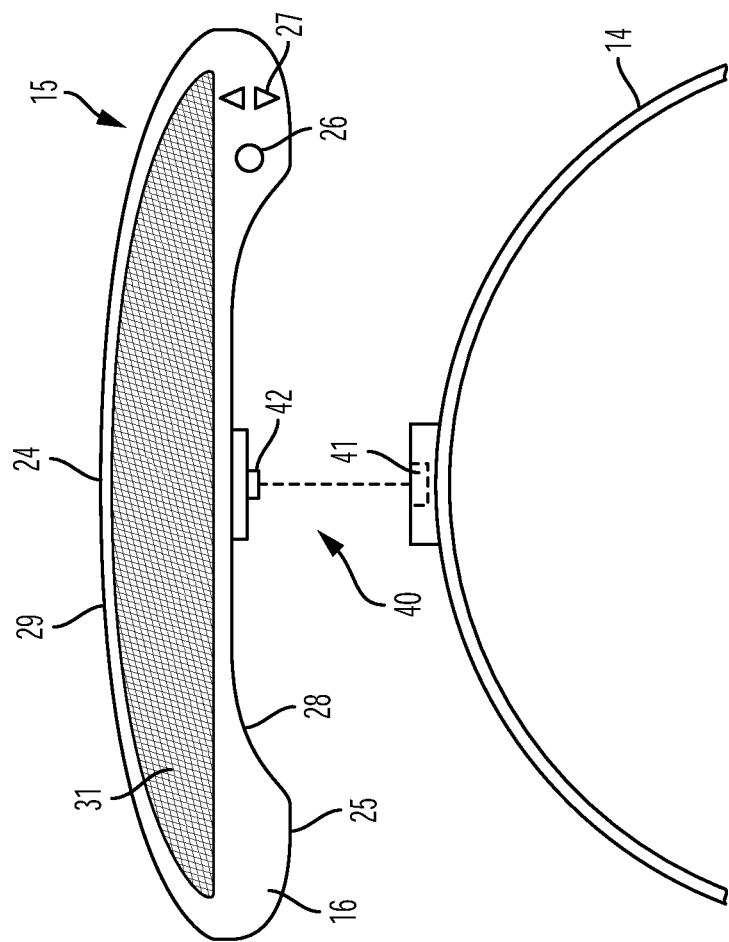
FIG. 3 shows a front elevation view of an embodiment of the housing of the animal bark control device taken along line III-III of FIG. 2.

Referring now to FIG. 3 there is shown a front elevation view of an embodiment of the housing of the animal bark control device taken along line III-III of FIG. 2. The housing 15 comprises a front side 16 opposite a rear side (shown in FIG. 2), and a curved bottom side 28 extending between opposing distal ends 25 forming an open neck receiving area. The curved bottom side 28 is configured to rest flush against a neck of a dog when mounted thereon. In the shown embodiment, the housing 15 comprises a crescent shape having a mirror symmetry about a central axis.

In the illustrated embodiment, the speaker 31 is positioned on the front side 16 of the housing. An upper end of the speaker 31 conforms to a curvature of the upper end of the housing, whereas an opposing lower end of the speaker is linear. In this way, the speaker 31 rests directly behind the ears of the dog when mounted to the dog. Further, in the illustrated embodiment, the length of the housing 15, as measured between opposing distal most ends thereof, is less than the diameter of the collar 14. In this way, the housing 15 will not extend beyond half the circumference of the collar when disposed in a loop. Thus, the dog will be unable to access the housing 15 with its mouth and chew thereupon. Additionally, the speaker 31 faces toward the ears of the dog and away from the rear side of the dog. The position of the speaker on the front side of the housing 15 allows sound emitted from the speaker to only be directed toward the dog and not multi-directionally. In alternate embodiments, the speaker is positioned along any suitable surface of the housing, such as the entire front side or the top side 29 thereof.

In the illustrated embodiment, the housing 15 comprises a control operably connected and configured to operate the speaker and a power source. In the illustrated embodiment, the controls are positioned on the front side of the housing and include an on/off button 26 and volume control 27. In some embodiments, the housing is wider along a central area, defined at the apex 24 thereof, and tapers towards the distal ends 25. In this way, the central area provides a larger surface area for controls and ease of handling of the housing 15 during removal thereof or when adjusting the length of the bridge 12. In some embodiments, the housing includes a pivot disposed centrally thereon, wherein the housing comprises a first section and a second section configured to rotated about the pivot and alter a dimension of the open neck receiving area.

In the illustrated embodiment, the housing 15 is removably securable to the bridge via a clip mechanism 40 (additionally shown in FIG. 2). The clip mechanism 40 comprises a female end 41 and a male end 42. The female end 41 is disposed on the bridge and the male end 42 extends from the curved bottom side 28 of the housing 15. In the illustrated embodiment, the female end is positioned on the surface of the bridge and over the collar 14, such that a portion of the bridge overlaps the collar 14. However, in alternate embodiments, the female end 41 of the clip mechanism 40 is positioned any suitable location along the bridge or disposed directly on the collar. The female end 41 is configured to receive the male end 42 and secure the housing 15 to the bridge. In the illustrated embodiment, the female end includes a recess that receives a protrusion on the male ends such that they are clipped to one another. Further, there is a magnetic connection between the female end and the male end.

Figure 4:
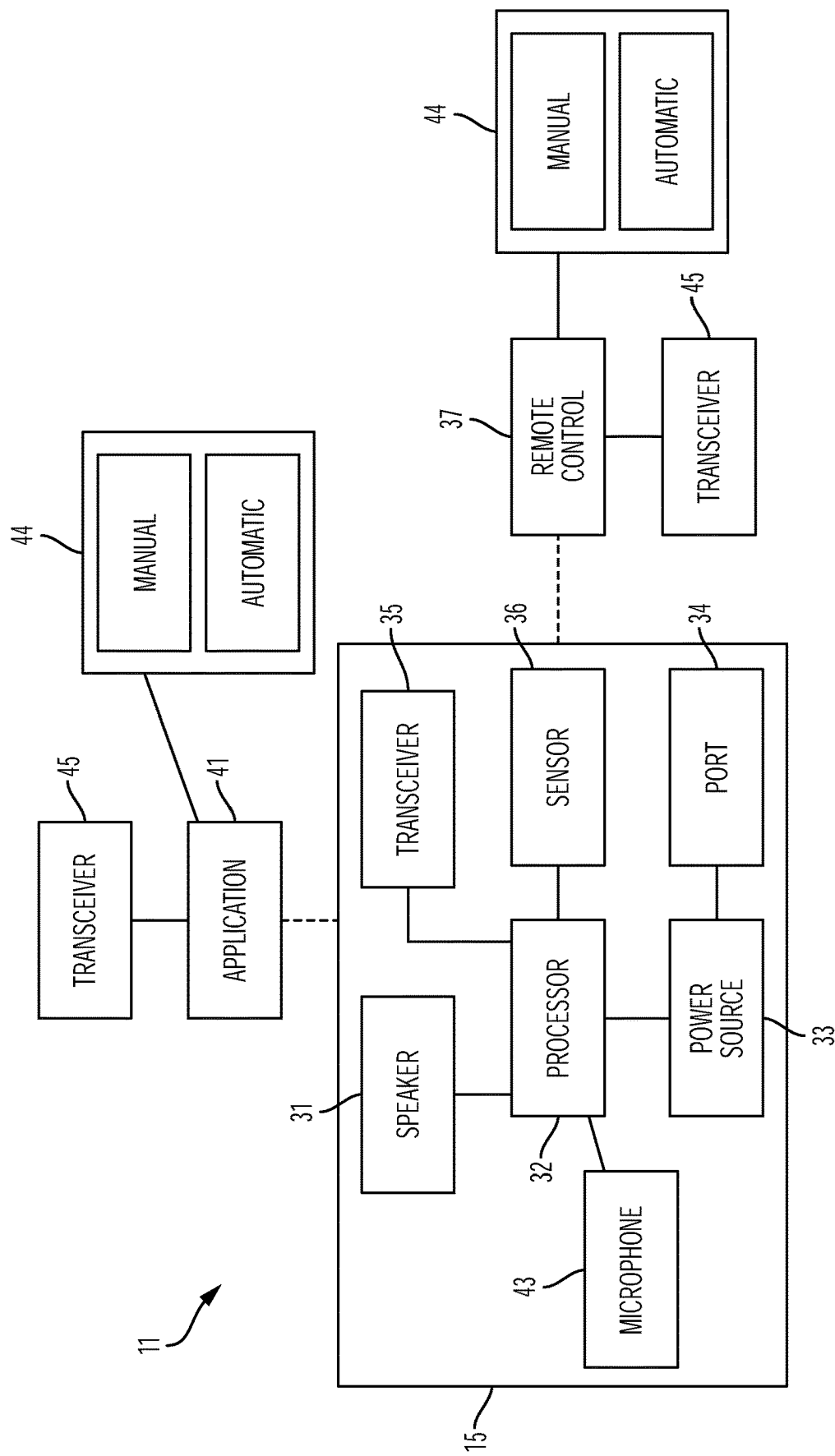
FIG. 4 shows a block diagram of one embodiment of the animal bark control device and remote electronic device.

Referring now to FIG. 4 there is shown a block diagram of one embodiment of the animal bark control device and remote electronic device. The animal bark control device 11 comprises a processor 32 having a logic that performs various steps upon activation. The processor 32 is in operable connection with the speaker 31 and is configured to emit an audible corrective sound directly to the dog. This corrective sound can calm an already barking dog, distract the dog from an external sound that triggered the barking, or deliver commands from an owner via a remote control device. The speaker 31 is operable from the controls positioned directly on the housing, and in alternate embodiments, from at least one of the controls on the remote control 37. In this way, a person can activate the speaker 31 remotely without being in the same room as the dog or directly contacting the housing. A transceiver is disposed within the housing such that the remote control 37 is in operable connection with the housing 15 via any suitable wireless means. In some embodiments, the remote control 37 is in operable connection with the processor 32 via Bluetooth. Each remote control includes a dedicated wireless transceiver in case the remote control is unable to pair with the speaker 31 via Bluetooth. In some embodiments, the housing includes a dedicated transmitter and receiver configured to connect to a smart device or remote control.

In the illustrated embodiment, a sensor 36 is disposed within the housing 15 and in operable connection with the processor 32 and speaker 31. The sensor 36 is configured to detect a threshold sound whereupon the animal bark control device 11 activates the speaker. In some embodiments, the threshold sound is equivalent to a dog bark, whereas other threshold sounds can be environmental in nature, such as a knock on the door or people talking. Upon detection by the sensor, the speaker is directed to emit a sound configured to produce a corresponding reducing wave adapted to reduce an effective sound heard by the animal. The corresponding reducing wave interacts with the detected threshold sound producing a noise cancelling effect. The processor is operably connected to a non-transitory memory device disposed within the housing 15 so as to store multiple exemplary corrective sounds adapted to produce a calming response. In some embodiments, a power source 33 is disposed within the housing, such as a battery. In other embodiments, the housing comprises a port 34 for connecting to an external power source, such as an electrical outlet, in order to supply power to the electrical components of the housing. In the illustrated embodiment, the housing 15 includes a microphone 43 so as to allow the user to hear through a remote device sounds detected by the microphone. The microphone 15 is beneficial in a situation when the user loses sight of the dog wearing the animal bark control device 11 and uses the sounds detected by the microphone to locate the dog.

In some embodiments, the animal bark control device 11 includes a software application 41 that allows the user to connect the speaker to a non-local storage of media in order to emit other sounds or music not locally stored on the memory. In some embodiments, the remote control 37 or the software application 41 disposed on a smart device allows the user to submit a verbal command therefrom, through the speaker 31 in order to train, command, or verbally soothe the dog with the user's voice. The verbal command provides the ability of the user to train the dog, keep the dog as quiet as needed in a situation such as search and rescue, or out of harms way. Both the software application and the remote control have a plurality of activation modes 44, manual or automatic. In automatic mode, the sensor 36 is operational and configured to cause the activation of the speaker. In the manual mode, the sensor 36 is nonoperational and the user manually turns the speaker on or off.

The animal bark control device can be used to control the barking of a dog by mounting the housing to a neck of a dog, wherein the speaker is positioned along the bridge extending from the housing. The bridge is adjusted to the length the is best suited for the size of the dog. The sensor detects a sound emitted from the dog or the environment surrounding the dog. Upon detection of the threshold sound, the speaker generates a sound therefrom. The corrective sound can be selected from storage on the memory device, a voice command provided by the user, or a sound selected from the non-local media storage through the application.

Referring now to FIG. 5 there is shown a side view of an embodiment of the animal bark control device in use and mounted to a dog. In the shown embodiment, the animal bark control device 11 is mounted to the dog via the harness 13 and a collar 14. The harness 13 comprises a securing band, wherein the harness is configured to secure to the dog such that the securing band is selectively positioned on a front side of a limb and fastened to form a closed loop, thereby preventing the removal of the harness from the dog. In some embodiments, the harness 13 includes any number of straps that join each other to securely mount to the dog. Additionally, a ring is positioned on the bridge 12 that provides a connection point for a leash fastener. The ring is positioned to a fixed region of the bridge 12 in direct connection to the harness 13. The bridge 12 is shown as being adjusted to a desired position, such that the housing 15 having the speaker (as shown in FIG. 3) is positioned directly behind each ear.

In one use, the dog begins a barking sequence while the animal bark control device 11 is activated. A user manually activates the speaker via a remote control, thereby causing the speaker to produce the corrective sound. In one embodiment, the speaker emits the corrective sound from a non-transitory memory device included in the housing to store multiple exemplary corrective sounds adapted to produce a calming response. The corrective sound calms the dog and interrupts the barking sequence. The continued activation of the corrective sound for a time after the barking sequence ensures the dog from reengaging with additional barking. Over time, the corrective sound assists with the training of the dog to cease barking. In this way, the animal bark control device 11 assists with the reduction of barking of the dog in a humane and effective manner.

In the illustrated embodiment, the method of preventing the bark of the dog includes four different operation modes. In the first operation mode, the speaker plays continuous music, wherein the music is stored within the memory on the housing, the remote device used to control the speaker, or a non-local storage media. In the second operation mode, the speaker only emits verbal or voice commands given by the user through the remote device or other handheld unit. In the third operation mode, the speaker emits music and there is a toggle function that allows a user to interrupt or abruptly stop the music from emitting through the speaker and give a voice command therethrough.

In the fourth operation mode, the housing, via the speaker, emits voice commands or music received by the remote device or other handheld unit, via the software application, as well as detects sound, via the microphone, in the proximity thereof and transmits the sound back to the remote device or other handheld unit. A control on the remote device allows a user to select whether voice commends are being transmitted to the housing or sounds is being received from the housing. In other embodiments, all modes of operation, including the first, second, and third mode, have a control disposed on the remote control device or other handheld unit that allows sound detected from the microphone to be received by the remote control device when the control is activated. In some embodiments, the control is a switch or toggle. In some embodiments, the housing comprises a recording feature that allows the memory to store sounds detected by the microphone.

In some embodiments, the method of preventing the bark of the dog only includes one of the four modes. In alternate embodiments, the method of preventing the bark of the dog comprises any two or more of the operation modes described herein.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal bark control device, comprising:
   a housing having a front side opposite a rear side, and a curved bottom side extending between opposing distal ends forming an open neck receiving area;
   a speaker disposed on the front side of the housing configured to face toward an ear of the dog when the housing is secured to a dog collar and mounted against the neck of the dog;
   a bridge comprising a first strap and a second strap and operably connected to the housing, wherein the housing is movable along a longitudinal length of the bridge;
   wherein the first strap sheaths a first end of the second strap, wherein the second strap is configured to move between an extended configuration and a retracted configuration.

2. The animal bark control device of claim 1, wherein the housing comprises a crescent shape.

3. The animal bark control device of claim 1, wherein the bridge is secured to the collar.

4. The animal bark control device of claim 1, wherein a first end of the bridge is secured to the collar and a second end of the bridge is secured to a harness.

5. The animal bark control device of claim 4, wherein the harness comprises a securing band configured to secure to the dog such that the securing band is selectively positioned on a front side of a limb and fastened to form a closed loop, thereby preventing the removal of the harness from the dog.

6. The animal bark control device of claim 1, wherein the bridge extends from a center section of the housing, between the opposing distal ends of the housing.

7. The animal bark control device of claim 1, wherein the first strap and the second strap are aligned and movable relative to each other along the longitudinal length of the bridge, wherein the housing is disposed on the second strap.

8. The animal bark control device of claim 1, wherein the retracted configuration the housing is positioned closer to the harness and the longitudinal length of the bridge is relatively less than the longitudinal length of the bridge in the extended configuration.

9. The animal bark control device of claim 8, wherein the second strap is secured to an adjustment mechanism, the adjustment mechanism is disposed within the first strap.

10. The animal bark control device of claim 9, wherein the adjustment mechanism includes a spring biased ratchet cooperatively engaged with the second strap, wherein rotation of the spring biased ratchet in a first direction and an opposing second directed causes the second strap to move between the retracted configuration and the extended configuration respectively.

11. The animal bark control device of claim 10, wherein the second strap extends exterior the first strap through an open slot disposed on the first strap, wherein the open slot is oriented traverse the longitudinal length of the bridge.

12. The animal bark control device of claim 1, wherein the front side of the housing comprises a control operably connected and configured to operate the speakers.

13. The animal bark control device of claim 1, wherein the speaker is operably connected to a sensor, the sensor configured to detect a threshold sound whereupon the animal bark control device activates the speaker.

14. The animal bark control device of claim 13, wherein a sound generated from the speaker is configured to produce a corresponding reducing wave adapted to reduce an effective sound heard by the dog.

15. The animal bark control device of claim 13, wherein the housing comprises a transceiver configured for wireless communication with a remote electronic device, wherein the remote electronic device is adapted to control a setting of the speaker.

16. A method of controlling an animal bark, comprising:
    mounting a housing to a neck of a dog, the housing having a front side opposite a rear side, and a curved bottom side extending between opposing distal ends forming an open neck receiving area;
    generating a sound from a speaker, the speaker disposed on the front side of the housing configured to face toward an ear of the dog when the housing is secured to a dog collar and mounted against the neck of the dog;
    positioning the speaker along a bridge extending from the housing such that the housing is movable along a longitudinal length of the bridge, wherein the bridge comprises a first strap that sheaths a first end of a second strap of the bridge such that the second strap is configured to move between an extended configuration and a retracted configuration;
    detecting a threshold sound via a sensor disposed within the housing.

17. The method of controlling an animal bark of claim 16, further comprising:
    emitting a corresponding reducing wave from the speaker adapted to reduce an effective sound heard by the dog.

18. The method of controlling an animal bark of claim 16, further comprising:
    maintaining a first operation wherein the speaker continuously produces music stored within non-transitory memory of the housing;
    maintaining a second operation mode wherein the speaker emits verbal or voice commands received from a remote control;
    switching between the first and second operation mode.

19. The method of controlling an animal bark of claim 16, further comprising:
    maintaining a sound detection mode, wherein a microphone disposed on the housing is adapted to transmit sound detected thereby to a remote device;
    maintaining a voice emitting mode, wherein the speaker emits verbal or voice commands received from the remote device;
    switching between the sound detection mode and voice emitting mode via the remote device.

* * * * *